United States Patent
Jacquard et al.

(10) Patent No.: US 11,579,437 B2
(45) Date of Patent: Feb. 14, 2023

(54) MULTI-PASSAGE CAVITY OF AN OPTICAL DEVICE FOR SPATIAL MANIPULATION OF LUMINOUS RADIATION

(71) Applicant: CAILabs, Rennes (FR)

(72) Inventors: Clément Jacquard, Rennes (FR); Pascal Desbiolles, Lannion (FR); Bertrand Denolle, Rennes (FR); Olivier Pinel, Rennes (FR); Guillaume Labroille, Rennes (FR)

(73) Assignee: CAILabs, Rennes (FR)

( * ) Notice: Subject to any disclaimer, the term of this patent is extended or adjusted under 35 U.S.C. 154(b) by 54 days.

(21) Appl. No.: 16/959,078

(22) PCT Filed: Dec. 19, 2018

(86) PCT No.: PCT/FR2018/053402
§ 371 (c)(1),
(2) Date: Jun. 29, 2020

(87) PCT Pub. No.: WO2019/129954
PCT Pub. Date: Jul. 4, 2019

(65) Prior Publication Data
US 2020/0326529 A1 Oct. 15, 2020

(30) Foreign Application Priority Data

Dec. 29, 2017 (FR) ...................................... 1763367

(51) Int. Cl.
*G02B 26/08* (2006.01)
*G02B 26/06* (2006.01)

(52) U.S. Cl.
CPC .................................. *G02B 26/06* (2013.01)

(58) Field of Classification Search
CPC ....................................................... G02B 26/06
USPC ......................................................... 359/300
See application file for complete search history.

(56) References Cited

U.S. PATENT DOCUMENTS

| 6,249,346 | B1 | 6/2001 | Chen et al. |
| 9,250,454 | B2 | 2/2016 | Morizur et al. |
| 2017/0010463 | A1 | 1/2017 | Morizur et al. |

OTHER PUBLICATIONS

International Search Report for International Application No. PCT/FR2018/053402 dated Apr. 4, 2019, 2 pages.
International Written Opinion for International Application No. PCT/FR2018/053402 dated Apr. 4, 2019, 6 pages.
Labroille et al., Mode Selective 10-Mode Multiplexer Based on Multi-Plane Light Conversion, 2016 Optical Fiber Communications Conference and Exhibition, (Mar. 20, 2016), 3 pages.
Morizur et al., Programmable Unitary Spatial Mode Manipulation, J. Opt. So. Am. A, vol. 27, No. 11, (Nov. 2010), pp. 2524-2531.

*Primary Examiner* — William Choi
(74) *Attorney, Agent, or Firm* — TraskBritt

(57) ABSTRACT

A multi-passage cavity made up of the assembly of a planar mounting and first and second reflective optical elements each having a main face arranged opposite one another, the main face of at least one of the optical elements being microstructured to modify the phase of incident luminous radiation that is reflected several times on each of the optical elements to form transformed radiation, the multi-passage cavity includes precisely three assembly interfaces.

16 Claims, 2 Drawing Sheets

MULTI-PASSAGE CAVITY OF AN OPTICAL DEVICE FOR SPATIAL MANIPULATION OF LUMINOUS RADIATION

CROSS-REFERENCE TO RELATED APPLICATIONS

This application is a national phase entry under 35 U.S.C. § 371 of International Patent Application PCT/FR2018/053402, filed Dec. 19, 2018, designating the United States of America and published in English as International Patent Publication WO 2019/129954 A1 on Jul. 4, 2019, which claims the benefit under Article 8 of the Patent Cooperation Treaty to French Patent Application Serial No. 17/63367, filed Dec. 29, 2017.

TECHNICAL FIELD

The present disclosure relates to an optical device for manipulating luminous radiation. More particularly, it relates to an optical device comprising a multi-passage cavity configured to modify the transverse phase profile of luminous radiation.

BACKGROUND

U.S. Pat. No. 9,250,454 and US2017010463 disclose optical devices, denoted by the acronym MPLC (Multi Plane Light Conversion), which allow any unitary spatial transformation of luminous radiation.

From a theoretical point of view, and as established in "Programmable unitary spatial mode manipulation," Morizur et Al, *J. Opt. Soc. Am. A*/Vol. 27, No. 11/November 2010, a unitary spatial transformation can effectively be decomposed into a succession of primary transformations, with each primary transformation affecting the transverse phase profile of luminous radiation. In practice, and without forming any limitation of this technology, MPLC components typically apply between 3 and 25 primary transformations.

The document G. Labroille, P. Jian, N. Barré, B. Denolle, and J. Morizur, "Mode Selective 10-Mode Multiplexer based on Multi-Plane Light Conversion, in *Optical Fiber Communication Conference*, OSA Technical Digest (online) (Optical Society of America, 2016), paper Th3E.5" discloses a particular embodiment of an MPLC device. It comprises a mounting on which an input stage has been arranged, making it possible to inject incident luminous radiation into the device, an output stage for extracting the transformed luminous radiation from the device, and a mirror arranged opposite a reflective optical element for forming a multi-passage cavity and making it possible to project and reflect the incident luminous radiation onto the optical element several times. The optical element has a microstructured main face for applying, to each reflection of the incident radiation, a modification of the transverse phase profile of the signal.

The parts constituting such a device must be positioned and oriented relative to one another with a very high degree of accuracy. This precision is necessary to ensure that the incident luminous radiation intercepts the optical element precisely at the microstructured zone, in order to impart a chosen transformation to it. This need for precision in the arrangement of the optical parts making up the device is especially the case since the same part can intercept the optical path of the incident radiation several times (typically between 3 and 25 times as stated above), and therefore even a small deviation in positioning or orientation from the required positioning may have a great impact on the correct functioning of the device.

In addition, optical positioning tolerances (with micrometer and, with regard to angular accuracy, microradian precision) are much smaller than the geometric manufacturing tolerances of the parts (at least if parts that can be produced at a reasonable cost are sought), and therefore the position of these parts, in their assembly positions, cannot generally be established in advance with the necessary accuracy.

In order to assemble the parts on the mounting, and, in particular, to form the multi-passage cavity, the input stage, the mirror and the optical element are first roughly positioned relative to one another. Incident luminous radiation is injected into the cavity thus formed, and the intensity of the luminous signal leaving the cavity is detected. The relative position and orientation of the input stage, mirror and optical element are also adjusted as finely as possible within all available degrees of freedom to optimize the detected intensity. This optimal relative positioning and orientation are temporarily fixed, for example, by means of adjustable holding clamps.

Alignment cubes (or more generally alignment parts) with planar faces and with abutting faces perpendicular to one another are then used to fix the input stage, the mirror and the optical element in their optimum positions on the mounting by means of a layer of glue or adhesive.

Two planar faces of the alignment cube are placed in contact, respectively, with a planar face of the mounting and a planar assembly face of the part to be fixed. By taking advantage of the relatively extensive planar contacts, the robustness and stability of the assembly are thus ensured. In general, the "assembly interface" is the planar contact between the contact surfaces of two parts assembled together.

When the part to be fixed has an orientation in space that does not permit the provision of a face that can come into planar contact with the mounting or with a first alignment cube arranged on the mounting, cubes can be assembled together at their planar faces in such a way that one of the faces of this assembly can come into planar contact with the assembly face of the part to be fixed and another face of this assembly can then come into planar contact with the mounting.

The same approach can be employed to assemble each of the parts forming the optical element on the mounting.

A schematic perspective of a multi-passage cavity 1 made up of a planar mounting 2 and two reflective optical elements 3, 3' arranged opposite one another is shown in FIG. 1. A first optical element 3 has a microstructured main surface 3a for modifying the phase of incident luminous radiation. It is assembled on the planar mounting by means of a first alignment cube 4, a first face of which is in planar contact with the mounting, and another face, perpendicular to the first, is in planar contact with an assembly face 3b of the first optical element. A second optical element 3', corresponding here to a simple mirror, is arranged on the mounting 2 by means of a second alignment cube 4', one face of which is in planar contact with the mounting 2. A second face of the second alignment cube 4' is in planar contact with a first face of a third cube 4". The third cube 4" is itself in planar contact, at a second face perpendicular to its first face, with an assembly face 3'b of the mirror 3'. This cube combination allows the mirror to be angularly oriented along a main axis A with precision and to fix this orientation (as well as the orientation in both directions perpendicular to this axis A) by means of the assembly interfaces.

In such an assembly model, each interface is a potential source of failure. The stresses, for example, of thermal origin, to which the assembly may be subjected may lead to the development of slight displacements, which are likely to affect the correct functioning of the device. The same applies to the layer of adhesive or glue, which enables two faces to be joined together, the properties of which may vary over time and according to the environmental conditions to which the device is exposed.

The present disclosure is intended to mitigate some or all of the above-mentioned disadvantages.

BRIEF SUMMARY

In order to achieve one of these objectives, the object of the present disclosure is to propose a multi-passage cavity made up of the assembly of a planar mounting, an alignment part, a first and a second reflective optical element each having a main face arranged opposite one another, the main face of at least one of the optical elements being microstructured to modify the phase of incident luminous radiation, which is reflected several times on each of the optical elements to form transformed radiation.

According to the present disclosure, the multi-passage cavity includes precisely three assembly interfaces between the planar mounting, the alignment part, and the first and second reflective optical elements.

By limiting the number of assembly interfaces in the multi-passage cavity to three, the risk of variations over time in the relative positioning and orientation of the component parts is limited.

According to other advantageous and non-limiting features of the present disclosure, considered alone or in any technically feasible combination:
- the mounting comprises a main face delimited by at least one planar edge and in which the first reflective optical element is assembled on the planar edge of the mounting at a first assembly interface, and the main face of the second reflective optical element is delimited by at least one planar lateral edge, the planar lateral edge being assembled on a first planar face of the alignment part at a second interface, and the alignment part having another planar face, perpendicular to the first, assembled on the mounting at a third interface;
- the main face of the first or second optical element is microstructured, the main face of the first reflective optical element is delimited by a longitudinal planar edge, the longitudinal planar edge being assembled on the planar face of the mounting, and the main face of the second reflective optical element is delimited by at least one lateral planar edge, the lateral planar edge being assembled on a first planar face of the alignment part at a second interface, and the alignment part having a further planar face, perpendicular to the first, assembled on the mounting at a third interface;
- the main faces of the first and second optical element are microstructured;
- only the main face of the first optical element is microstructured or only the main face of the second optical element is microstructured;

BRIEF DESCRIPTION OF THE DRAWINGS

Further features and advantages of the present disclosure will become apparent from the following detailed description of certain example embodiments of the present disclosure, which is given reference to the accompanying drawings, in which.

DETAILED DESCRIPTION

In order to simplify the following description, the same references are used for like elements or elements performing the same function in the prior art or in the various presented embodiments of the present disclosure.

For the sake of clarity, luminous radiation is defined in the present disclosure as radiation formed from at least one mode of an electromagnetic field, each mode forming a space-frequency distribution of the amplitude, phase, and polarization of the field. Consequently, the modification, manipulation or transformation of the phase of the luminous radiation means the space-frequency modification or transformation of at least one of the modes of the radiation.

The "shape" of radiation shall mean the transverse distribution of the amplitude and of the phase of the mode, or the combination of the transverse amplitude and phase distributions of the modes forming the radiation.

In very general terms, the present description relates to an optical device for manipulating incident luminous radiation so as to form transformed luminous radiation. Advantageously, the shape of the incident luminous radiation and of the transformed luminous radiation are different from one another. The manipulation of the incident luminous radiation involves the controlled modification of the transverse phase profile of this radiation, during a plurality of primary transformation, which contribute, in combination, to performing a specific optical function. This may involve spatial multiplexing or demultiplexing of the incident radiation or any other modal transformation in the spatial domain. It may, for example, involve 4 or more primary transformations, such as 8, 10, 12, 14 or even 20 or more elementary transformations.

The optical device comprises, on a mounting 2, a multi-passage cavity 1 for transforming the incident luminous radiation into transformed luminous radiation. The optical device may optionally comprise an input stage and an output stage for, respectively, guiding the injection of the incident luminous radiation and the extraction of the transformed luminous radiation from the cavity 1, when these radiations are not simply injected and/or extracted from the cavity 1 by simple propagation in free space.

For the sake of simplification of the figures illustrating the various embodiments of the present disclosure, the input and output stages have been omitted from these figures.

Figure 1:
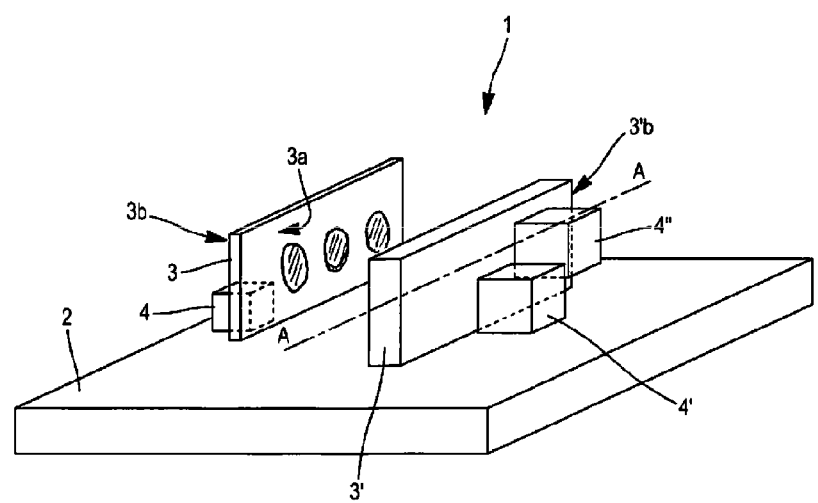
FIG. 1 shows a schematic perspective view of a multi-passage cavity according to the prior art.
Figure 2:
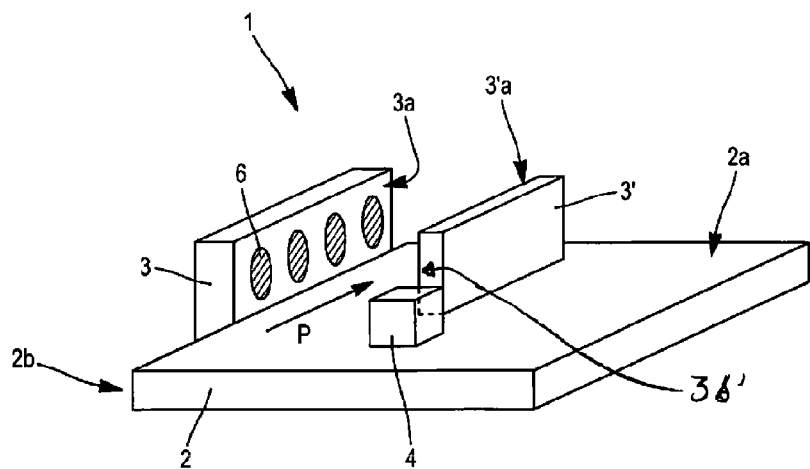
FIG. 2 shows a multi-passage cavity according to a first embodiment of the present disclosure.

FIG. 2 shows a multi-passage cavity 1 according to a first embodiment of the present disclosure.

The multi-passage cavity 1 is made up of the assembly of a planar mounting 2, an alignment part 4 and two reflective optical elements 3, 3' arranged opposite one another. No other parts are required to form the multi-passage cavity 1, i.e., to assemble together the mounting 2, the alignment part and the two reflective optical elements in relative positions and orientations making the cavity functional.

The first optical element 3 has a microstructured main surface 3a, facing the interior of cavity 1. This microstructuring is configured to modify the phase of incident luminous radiation, which is reflected several times during its propagation in the cavity 1 in the general direction P.

The term "microstructured face or surface" shall mean, for example, that the face or surface may have "pixels" with dimensions ranging from a few microns to a few hundred microns. Each pixel has an elevation, relative to a mean plane defining the face or surface in question, of at most a few microns or at most a few hundred microns.

As is clearly shown in FIG. 2, the main face 3a of the first optical element 3 comprises a plurality of microstructured zones 6, each microstructured zone 6 being arranged on the main face 3a in order to precisely receive the incident luminous radiation and apply a primary phase transformation thereto.

Reference may be made to the various cited prior art documents to understand how the repeated application of these primary transformations allows a selected transformation of the incident luminous radiation to be achieved and how the optical element 3 can be designed to implement such a transformation. Reference is also made to these documents in order to see examples of digital design methods for the microstructuring on the main face 3a of the optical element 3. The digital model of these microstructurings can be used to produce the optical element, for example, by machining, molding and/or etching of an optical blank.

In the case of the example shown in FIG. 2, the first optical element 3 is a reflective phase plate and the second optical element 3' is a simple mirror, i.e., its main face 3'a, oriented toward the inside of cavity 1, is not microstructured.

It should be noted that the microstructured zones 6 of the main face 3a of the first optical element 3 are separate from one another here, but this characteristic is not essential and any other microstructured configuration could also be suitable, as long as it allows a determined transformation of the incident radiation to be applied.

The mounting 2 comprises a main face 2a, delimited by at least one planar edge 2b, perpendicular to the main face 2a of the mounting 2. The main face 3a of the first optical element 3 is assembled on the planar edge 2b of the mounting 2 at a first assembly interface. In this configuration, the angular position of the first optical element can be adjusted about an axis of rotation perpendicular to its main surface 3a. Thus, the relative angular position of the first optical element 3 with respect to the second optical element 3' can be adjusted about an axis normal to the main surface 3a of the first optical element 3. This adjustment is particularly beneficial when the two optical elements 3, 3' are microstructured.

The mirror 3' is arranged so that its main face 3'a faces the inside of cavity 1, opposite the main face 3a of the first optical element 3.

The main face 3'a of the mirror 3' is delimited by at least one planar lateral edge 3b', i.e., a planar surface whose normal is oriented in the general direction P. This lateral planar edge 3b' is assembled on a first planar face of the alignment part 4 (here a cube 4) at a second interface. The alignment part 4 has another planar face, perpendicular to the first, which is assembled on the mounting 2 at a third interface.

It should be noted that this embodiment takes advantage of the degrees of freedom offered in the positioning and orientation of the second optical element, when this consists of a mirror 3', i.e., a non-microstructured reflective surface. Indeed, a mirror can, to a certain extent, be moved in translation in the direction P and in rotation along an axis perpendicular to its main reflective face 3'a, without affecting the correct functioning of the optical device. The alignment part 4 assembled on the planar lateral edge of the mirror allows the orientation of this mirror about an axis of rotation in direction P to be fixed in a functional position. The mirror 3' is generally not in planar contact with the mounting 2, and therefore there is no assembly interface between these two parts.

In order to allow the alignment part 4 to be brought into planar contact with both the mounting 2 and the lateral planar edge 3b' of the mirror, the angular placement of the mirror about its axis of rotation perpendicular to its main face 3'a is required so that the lateral planar edge 3b' is perpendicular to the planar face 2a of the mounting 2.

The assembly configuration just described is particularly advantageous in that it limits the number of assembly interfaces to three, which significantly improves the robustness of the cavity and the simplicity of its assembly, without imposing constraints on the geometric tolerances of the parts that make it up. Nor does it modify the general assembly process presented in the introduction of this disclosure, which allows it to be deployed using the same existing equipment and methods. The three interfaces make it possible to precisely adjust three degrees of freedom, which are the only ones whose precise adjustment is absolutely necessary for the correct assembly of the device.

In a variant of this embodiment of the present disclosure, the main faces 3a, 3'a of the first and second optical element 3, 3' are microstructured. The second optical element 3' is therefore not a simple mirror, but may be formed of a reflective phase plate, similarly to the first optical element.

In another variant, only the main face 3'a of the second optical element 3' is structured and the first optical element 3 is formed by a simple mirror.

Figure 3:
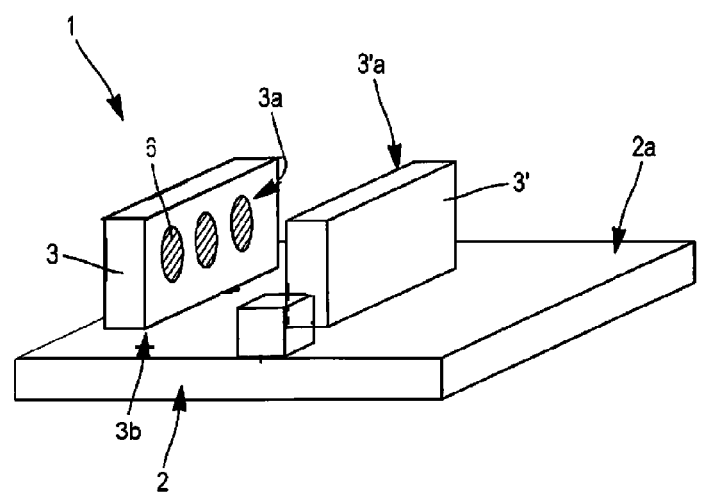
FIG. 3 shows a multi-passage cavity according to a second embodiment of the present disclosure.

FIG. 3 shows an example of a second embodiment of a multi-passage cavity 1 according to the present disclosure.

In this embodiment, the second optical element 3' is assembled on the mounting 2 in the same way as in the first embodiment, at two interfaces. Its description will therefore not be repeated, for the sake of brevity.

The main face 3a of the first optical element 3 is delimited by a longitudinal planar edge 3b, perpendicular to the main face. This second embodiment differs from the first embodiment in that the longitudinal planar edge 3b is assembled on the planar surface 2a of the mounting 2, which constitutes the third interface.

In this second embodiment, and contrary to the first embodiment, it is not possible to adjust the relative angular position of the first optical element 3 with respect to the second optical element 3' about an axis normal to the main surface 3a. This embodiment is also more particularly adapted to configurations in which only the main face 3a of the first optical element 3 or only the main face 3'a of the second optical element 3' is microstructured. In other words, the microstructured areas can be carried by either of the main faces 3a, 3'a of the optical elements 3, 3', but preferably not by both, without this option being totally excluded.

Regardless of the embodiment chosen and the variant chosen, a multi-passage cavity according to the present disclosure comprises precisely three assembly interfaces between the mounting, the alignment part and the optical elements. These three interfaces are necessary and sufficient for relative positioning of the elements 3, 3' with micrometer precision and, with regard to angular accuracy, microradian precision. Limiting the number of interfaces to three makes the device particularly robust over time by limiting the sources of potential failure.

Of course, the present disclosure is not limited to the embodiments described, and variations of implementation without departing from the scope of the present disclosure as defined by the claims can be added.

Thus, although it has been indicated that the assembly interfaces are formed by bringing two planar parts into planar contact with one another, the present disclosure provides for a strengthening of their adhesion by the addition of an adhesive or an adhesive layer, which can be formed before the assembly step or can be introduced between the two contacting faces after their assembly.

The materials making up the different parts forming the cavity are advantageously the same, so as to limit the thermal stresses that may be applied at the assembly interfaces. These materials may be, in particular, silicon, glass or quartz.

The invention claimed is:

1. A multi-passage cavity made up of an assembly of a planar mounting, an alignment part, a first and a second reflective optical element each having a main face arranged opposite one another, the main face of at least one of the optical elements being microstructured to modify a phase of incident luminous radiation that is reflected several times on each of the optical elements to form transformed radiation, wherein the multi-passage cavity includes precisely three assembly interfaces between the planar mounting, the alignment part, and the first and second reflective optical elements.

2. The multi-passage cavity of claim 1, wherein the mounting comprises a main face delimited by at least one planar edge, and wherein the first reflective optical element is assembled on the planar edge of the mounting at a first assembly interface, and the main face of the second reflective optical element is delimited by at least one planar lateral edge, the planar lateral edge being assembled on a first planar face of the alignment part at a second interface, the alignment part having another planar face, perpendicular to the first, assembled on the mounting at a third interface.

3. The multi-passage cavity of claim 2, wherein the main faces of the first and second optical elements are microstructured.

4. The multi-passage cavity of claim 2, wherein only the main face of the first optical element is microstructured.

5. The multi-passage cavity of claim 2, wherein only the main face of the second optical element is microstructured.

6. The multi-passage cavity of claim 1, wherein the main face of the first or second optical element is microstructured, and wherein:
the main face of the first reflective optical element is delimited by a longitudinal planar edge, the longitudinal planar edge being assembled on the planar face of the mounting;
the main face of the second reflective optical element is delimited by at least one lateral planar edge, the lateral planar edge being assembled on a first planar face of the alignment part at a second interface; and
the alignment part has another planar face, perpendicular to the first, assembled on the mounting at a third interface.

7. The multi-passage cavity of claim 6, wherein only the main face of the first or second optical element is microstructured.

8. The multi-passage cavity of claim 6, wherein the main faces of the first and second optical elements are microstructured.

9. An optical device including a multi-passage cavity, the device comprising:

a planar mounting plate;
an alignment element having a first planar surface and a second planar surface, the first and second planar surfaces of the alignment element being perpendicular to one another;
a first reflective optical element having a reflective main face and a peripheral edge; and
a second reflective optical element having a reflective main face arranged opposite to the reflective main face of the first reflective optical element;
wherein the main face of at least one of the first optical element and the second optical element being microstructured to modify a phase of incident luminous radiation that is reflected several times between the first optical element and the second optical element to form transformed radiation, and
wherein the multi-passage cavity includes precisely three assembly interfaces between the planar mounting plate, the alignment element, the first optical element, and the second optical elements.

10. The optical device of claim 9, wherein the planar mounting plate has a planar main face delimited by at least one planar edge, the planar edge oriented perpendicular to the planar main face of the planar mounting plate, and wherein the first reflective optical element is assembled on the planar edge of the mounting plate at a first assembly interface, and the main face of the second reflective optical element is delimited by at least one planar lateral edge, the planar lateral edge of the second reflective optical element being assembled on the first planar surface of the alignment element at a second interface, the second planar surface of the alignment element assembled on the planar main face of the planar mounting plate at a third interface.

11. The optical device of claim 10, wherein the reflective main faces of both the first and second reflective optical elements are microstructured.

12. The optical device of claim 10, wherein only the reflective main face of the first optical element is microstructured and the reflective main face of the second optical element is not microstructured.

13. The optical device of claim 10, wherein only the reflective main face of the second optical element is microstructured and the reflective main face of the first optical element is not microstructured.

14. The optical device of claim 9, wherein the reflective main face of the first or second optical element is microstructured, and wherein:
the reflective main face of the first reflective optical element is delimited by a longitudinal planar edge, the longitudinal planar edge being assembled on a planar main face of the mounting plate;
the main face of the second reflective optical element is delimited by at least one lateral planar edge, the lateral planar edge being assembled on the first planar surface of the alignment element at a second interface; and
the second planar surface of the alignment element is assembled on the planar main face of the mounting plate at a third interface.

15. The optical device of claim 14, wherein only the reflective main face of the first or second optical element is microstructured and the other reflective main face of the first or second optical element is not microstructured.

16. The optical device of claim 14, wherein the reflective main faces of both the first and second optical elements are microstructured.

* * * * *